J. G. RHODES.
RECEPTACLE FOR SANDWICHES OR THE LIKE.
APPLICATION FILED NOV. 29, 1915.
1,216,842.
Patented Feb. 20, 1917.
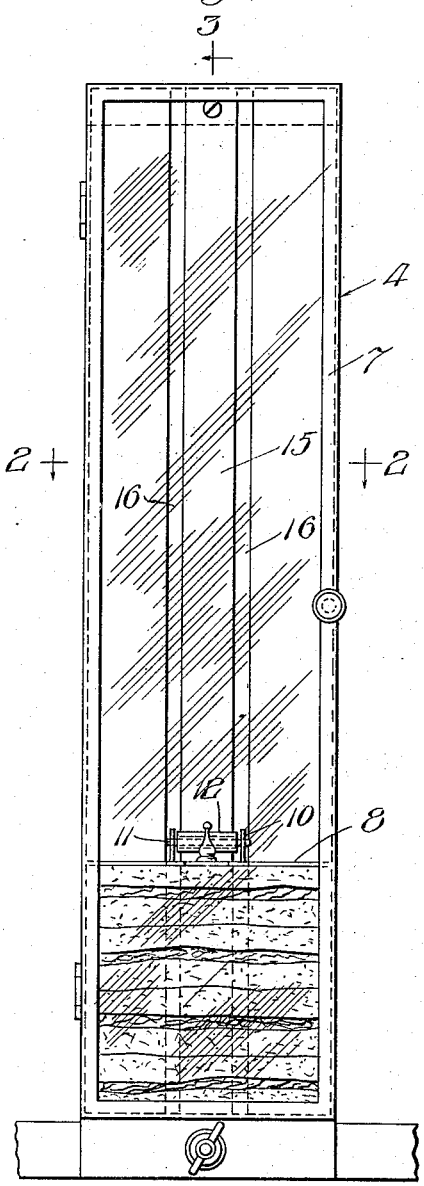
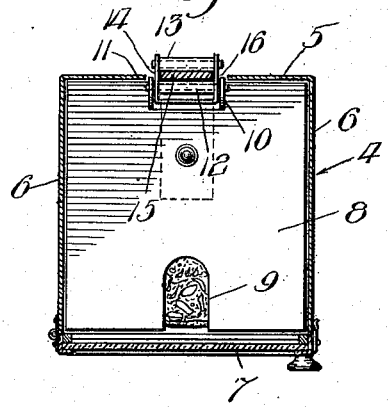
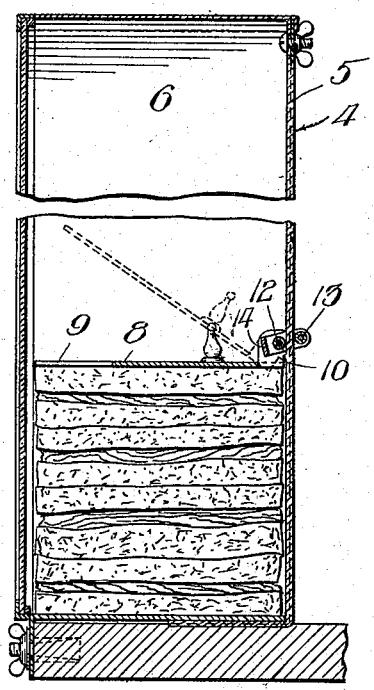
Witness:
Harry S. Gaither
Inventor
James G. Rhodes
by _____ Att'ys.

UNITED STATES PATENT OFFICE.

JAMES G. RHODES, OF CHICAGO, ILLINOIS.

RECEPTACLE FOR SANDWICHES OR THE LIKE.

1,216,842.   Specification of Letters Patent.   Patented Feb. 20, 1917.

Application filed November 29, 1915. Serial No. 64,053.

*To all whom it may concern:*

Be it known that I, JAMES G. RHODES, a citizen of the United States, residing at Chicago, in the county of Cook and State of Illinois, have invented certain new and useful Improvements in Receptacles for Sandwiches or the like, of which the following is a specification.

The present invention relates to a receptacle or casing arranged and adapted for the purpose of containing sandwiches or a similar commodity.

One of the objects of the invention is to provide a casing of the above type which will be of a sanitary nature, and which will keep the commodity placed therein in a fresh and moist condition.

A further object of the invention is to provide a cover or plate which fits within the casing and is adapted and arranged to rest upon the top of the commodity placed therein, for the purpose of keeping air from the commodity, which would tend to dry out and render same stale.

A further object of the invention is to arrange this cover so that it will have both a sliding and pivotal movement within the casing, to permit an easy removal of the commodity, as desired.

A further object of the invention is to arrange the sliding connection between the cover and the casing in a manner whereby, when the cover is brought to a horizontal position, it tends to bring about a binding engagement, so that the cover is prevented from a sliding movement within the casing. This enables the cover to remain suspended while the commodity is being put in place within the casing.

And the invention further consists in the features of construction and combination of parts hereinafter described and claimed.

In the drawings:

Figure 1 is an elevation of the casing of the present invention;

Fig. 2 is a section on line 2—2 of Fig. 1, looking in the direction of the arrows; and Fig. 3 is a section on line 3—3 of Fig. 1, looking in the direction of the arrows, with the central portion of the casing broken out.

In the art to which the present invention relates, it is customary in restaurants and like places to carry a number of sandwiches, or like commodities, on hand for use from time to time, as the occasion requires. It is necessary that such commodities be kept in a sanitary condition, and also that they be kept in a manner whereby air is excluded from them, so that they will remain moist and fresh. And the primary aims and objects of the present invention are to provide a receptacle or casing for such commodities which will bring about the foregoing results.

Referring now to the drawings, the receptacle or casing 4 is, as shown, of rectangular formation, comprising a rear wall 5, side walls 6, and a front door 7, and can be of such size and made of such material as may be deemed most expedient in manufacture.

Located within the casing is a plate or cover 8 of a size, as will be seen from Fig. 2, substantially equal to the cross area of the casing. This cover is adapted to rest upon the top of the uppermost sandwich or other article within the casing, as will be apparent from Fig. 1, and when so resting serves to protect the sandwiches against the action of air, which would tend to dry them out and eliminate their freshness. Also, by the use of the cover as aforesaid, the sandwiches or other articles can be pressed more or less tightly against one another, thus increasing the tendency to maintain them in fresh condition.

As shown, the cover 8 is provided with an opening 9 at its front edge, to permit easy engagement of the finger of the user with the sandwich lying beneath the same; and the cover at its rear edge is formed with companion upwardly extending ears 10, through which passes a pin 11, which forms a mounting for a roller 12. This roller, together with a roller 13, is carried by a U-shaped strap 14; and the ears 10 are capable of a pivotal movement about the pin 11, whereby the cover can swing up within the casing about said pin as a pivot. When swung upward, it assumes the dotted line position of Fig. 3, and, as will be apparent, enables the ready extraction of a sandwich, or sandwiches.

The rollers 12 and 13 bear upon opposite faces of a strip or rail 15, formed in the back of the receptacle by placing companion slots in said back. The U-shaped member 14 passes through these slots and embraces the rail 15, and thus, with the rollers, forms a slidable connection between the casing and the cover, whereby the latter may be moved up and down within the casing in correspondence to the number of sandwiches placed therein. As will be seen from Fig. 3, when the plate or cover drops to a horizontal position, it cants or tilts the U-shaped member 14, bringing the rollers into a biting engagement with the rail 15, which holds the plate or cover against sliding movement within the receptacle. This feature is of use when the receptacle is being filled. At such time the cover can be moved to the uppermost part thereof, and will be prevented from swinging downward on its pivot by reason of the said pivot being offset from the cover. The cover will therefore remain in such moved position until the commodity is placed within the receptacle. Otherwise, the cover would have to be held suspended by the hand of the operator during the filling operation.

The invention as a whole is cheap and simple of construction and contains no parts which would be liable to get out of order and impair the operation of the same. Changes and modifications may be made in the construction of the device as shown, provided the structure is maintained within the scope of the appended claims.

I claim:

1. In a receptacle for sandwiches or the like, the combination of a casing, a cover located within the casing and adapted to rest upon the top of the commodity placed therein, a member having sliding engagement with one wall of the casing and a pivotal connection between said member and cover, substantially as described.

2. In a receptacle for sandwiches or the like, the combination of a casing, a cover located within the casing and adapted to rest upon the top of the commodity placed therein, a rail constituting a portion of one wall of the casing, a member slidably mounted upon said rail, and a pivotal connection between said member and cover, substantially as described.

3. In a receptacle for sandwiches or the like, the combination of a casing, a cover located within the casing and adapted to rest upon the top of the commodity placed therein, one wall of said casing being formed with companion slots to provide an intermediate rail, a roller traveling along the surface of said rail, a mounting for the roller, and a pivotal connection between said mounting and cover, substantially as described.

4. In a receptacle for sandwiches or the like, the combination of a casing, a cover located within the casing and adapted to rest upon the top of the commodity placed therein, one wall of said casing being formed with companion slots to provide an intermediate rail, a roller traveling along the surface of said rail, a U-shaped member embracing said rail and acting as a carrier for said roller, and a pivotal connection between the U-shaped member and cover, substantially as described.

5. In a receptacle for sandwiches or the like, the combination of a casing, a cover located within the casing and adapted to rest upon the top of the commodity placed therein, a member having a sliding engagement with a wall of the casing, a pivotal connection between said member and cover, and said cover when moved to horizontal position canting said member with respect to the wall upon which it slides, to hold the cover against sliding movement within the casing, substantially as described.

JAMES G. RHODES.

Copies of this patent may be obtained for five cents each, by addressing the "Commissioner of Patents, Washington, D. C."